April 17, 1956   J. E. LILIENFELD   2,742,596
COILED-TYPE CONDENSER UNIT FOR ELECTROLYTIC CAPACITORS
AND APPARATUS FOR COILING UPON A SUPPORTING MANDREL
THE ELECTRODE ASSEMBLY THEREOF
Filed Feb. 19, 1952   2 Sheets-Sheet 2

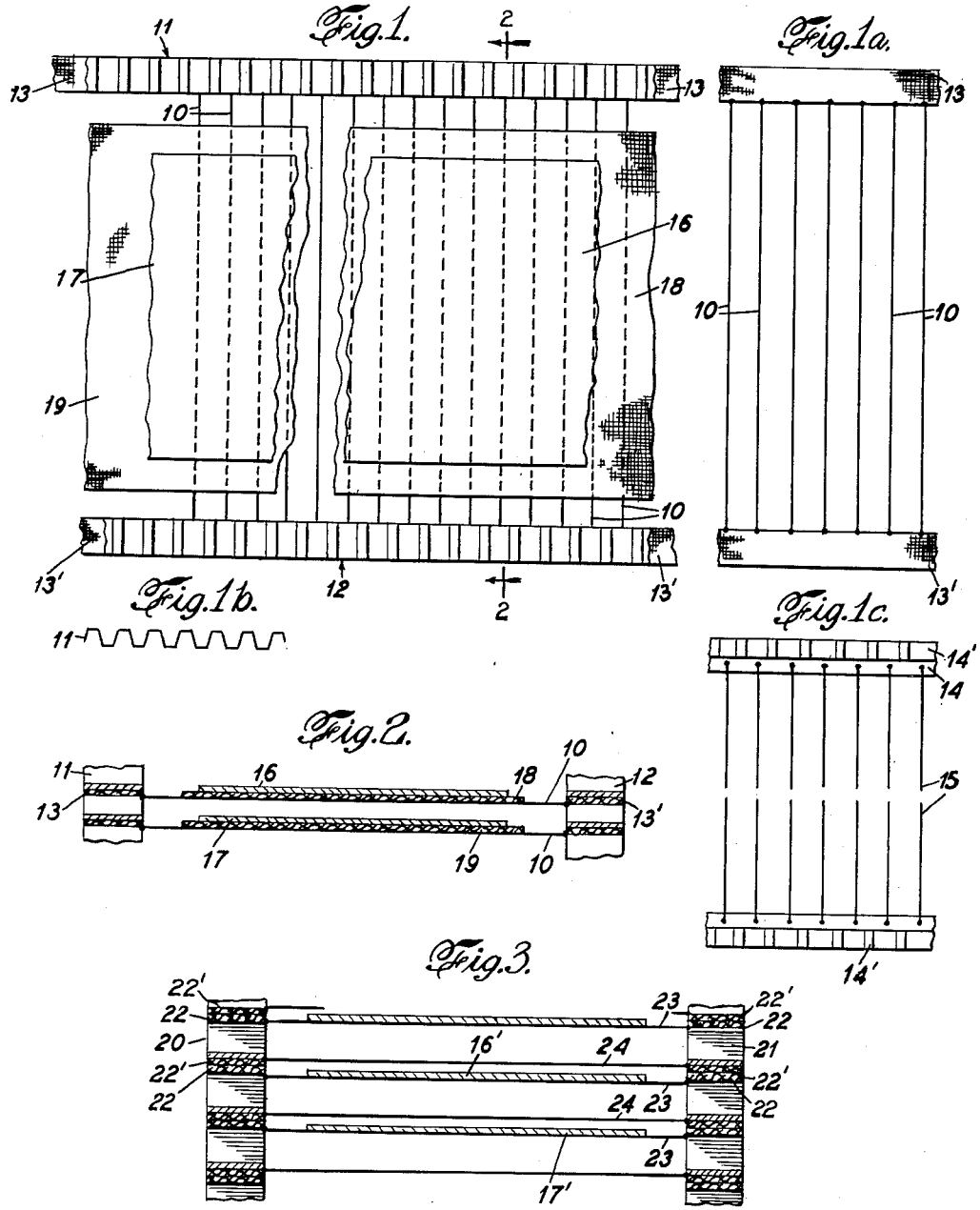

INVENTOR.
JULIUS EDGAR LILIENFELD
BY
Emery Holcombe & Blair
ATTORNEYS.

United States Patent Office 2,742,596
Patented Apr. 17, 1956

2,742,596

COILED-TYPE CONDENSER UNIT FOR ELECTROLYTIC CAPACITORS AND APPARATUS FOR COILING UPON A SUPPORTING MANDREL THE ELECTRODE ASSEMBLY THEREOF

Julius Edgar Lilienfeld, St. Thomas, V. I., assignor to Samuel D. Warren, Essex, and Ralph F. Burkard, Arlington, Mass., jointly Application February 19, 1952, Serial No. 272,394

12 Claims. (Cl. 317—230)

The invention relates to electrolytic capacitors of the conventional coil type having band or strip electrodes but utilizing an electrolyte of low viscosity, for example an aqueous electrolyte; and it relates more particularly to the positioning of the filmed electrode or electrodes upon a supporting mandrel in a manner such as to suspend freely an anodized electrode by a novel arrangement of spacer elements and separator-supporter elements.

Coil-type condensers which are well suited as so-called D. C. condensers in filter circuits, present a problem when they are to be used in A. C. power lines. Thus, the requirement of combining in a condenser, when utilized for A. C. operation, an electrolyte of low viscosity, a narrow spacing of electrodes and a free suspension of the anodized electrode, does not arise so long as electrolytic condensers are used in filter circuits or other D. C. operated circuits. In the operation, however, of such condensers in A. C. circuits, the heat generated per unit of heat exchanging area is considerable, while in D. C. operation it is narrowly limited. This limitation in the latter case stems from the fact that the A. C. component affecting coil-type condensers in the so-called D. C. circuits is relatively small and therefore the amount of heat to be dissipated is so insignificant that the condensers can be built in extremely compact form. All these favorable conditions do not exist in a condenser which is intended for operation on an A. C. circuit, for example, for power factor correction. The heat generated then is significant and the capacitor has no adequate means for dissipating it inasmuch as it presents a very small area to the atmosphere and is incapable, therefore, of dissipating much energy.

To dissipate such energy is an operating problem difficult to overcome with the conventional construction of capacitors embodying impregnation of a thin band of fabric or paper with a very small amount of highly viscous electrolyte. There is also the objection that the relatively small amount of moisture in the viscous electrolyte dries out quickly as the heat develops in operation, eventually destroying the condenser because of the attendant so-rapidly increasing resistance. I find that for operation on an A. C. circuit it is imperative to provide for a circulation of a nonviscous electrolyte sufficient to carry off the heat and so obtain a kind of thermosyphon cooling action.

It would be relatively simple to build a condenser satisfying this condition if it were not imperative for physicochemical reasons to avoid the use of low resistance electrolytes. This being the case, however, not any arbitrary arrangement of electrodes is usable, rather only such arrangements as allow for a very narrow and substantially uniform spacing between the electrodes to reduce the energy loss due to the high resistance of the electrolyte.

The aforesaid two requisites—low viscosity electrolyte and uniform, narrow spacing of the electrodes—being understood, it is to be noted that the latter introduces a further condition, viz, the unavoidable use or the introduction of some kind of spacers and/or separators. Such spacers and separators must not, however, be allowed to exert pressure on the film to an extent such as to permit contact between separator and film to occur without an interposed layer—no matter how thin—of the electrolyte. If that were not the case, the spots of pressure at such contacts would cause film breakdown. This amounts almost, figuratively speaking, to suspending the filmed electrodes and thus allowing for no pressure at the film beyond a very gentle force per unit area.

In a prior application for United States Letters Patent Serial No. 233,884, filed by me June 27, 1951, now Patent No. 2,686,892, I have disclosed a support for the capacitor electrodes, particularly the anodized electrode or electrodes, whereby an electrode is more or less floated in the electrolyte by virtue of the latter's viscosity while retaining the electrode's spatial position between porous separator elements. The arrangement is such that uniform and narrow spacing between electrodes is attained and circulation of electrolyte not impeded when the condenser elements are coiled on a mandrel or the like. This is effected by a condenser assembly embodying a pair of longitudinally disposed marginal spacer elements designed to afford a continuous channel therebetween in which an electrode band is supported upon a separator band of insulating porous material. This band of material serves also as a means for advancing the slack, free-ended anodized condenser element or elements in coiling the same over a mandrel for subsequent removal with the remaining condenser elements and mandrel from the coiling apparatus to provide a condenser assembly.

The present invention is concerned with a novel means of electrode support; and it has for an object to provide a supporting structure in the nature of a grid element which is to be located between a pair of longitudinal marginal spacer elements forming therewith a freely permeably grill-work to maintain not only an adequate separation of the electrodes but to enhance circulation of the electrolyte.

Another object of the invention is to utilize cord-like elements, subject to a tensioning component, for the support of the electrodes, at least one of the latter being anodized.

Still another object of the invention is to associate means with the supporting grid structure whereby the cord-like elements thereof will be permanently tensed, while being wound upon the supporting mandrel, and so maintained substantially parallel to one another transversely of the longitudinally disposed marginal spacer elements; also, to associate means with the mandrel thereafter to retain these cord-like elements in the aforesaid relationship.

In carrying out the instant invention, a grid-like structure is substituted for the aforesaid band of insulating porous material upon which an electrode may rest, the novel structure comprising cord-like elements positioned transversely to the marginal spacer elements and secured thereto to form a ladder-like support. Provision is made also to impart to these cord-like elements a tensioning component to maintain them taut and thus insure uniform spacing of the electrodes. Means are provided, furthermore, to effect a positively controlled feed of the anodized electrode or electrodes with respect to the remaining elements of the condenser unit in coiling the same upon a mandrel. If desired, provision may be made to wind therewith also a band of fabric between the cord-like elements and electrode.

The nature of the invention, however, will best be understood when described in connection with the accompanying drawings, in which:

Fig. 1 is a fragmentary plan view of an uncoiled section of the condenser elements, shown on an enlarged scale.

Fig. 1a is a fragmentary plan view of a novel electrode supporting-separator structure thereof; and Fig. 1b is a fragmentary elevation of the spacing element thereof.

Fig. 1c illustrates a modification in the supporting-separator structure.

Fig. 2 is a transverse section taken on the line 2—2, Fig. 1 of the drawings; and Fig. 3 is a similar section illustrating a modification.

Figure 4:
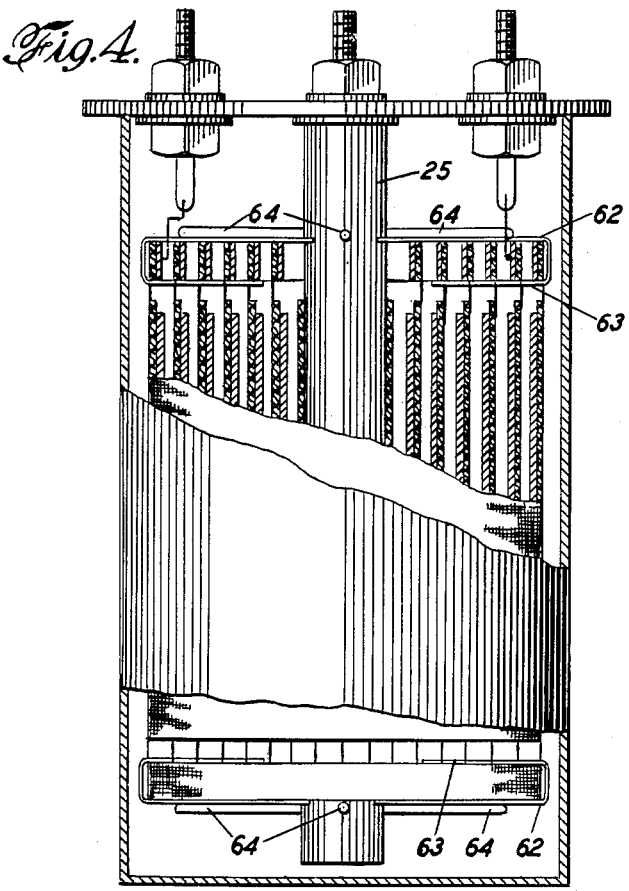
Fig. 4 is a front elevation of a capacitor as embodied in a nonpolarized form, and is shown partly in vertical section and with portions of the electrolyte container and coiled condenser assembly broken away to disclose the interiors.

Referring to the drawings, more particularly Figs. 1–3 thereof, the novel supporting structure for the electrodes of the condenser comprises a grid-like member in the nature of a succession of cord-like elements 10 arranged to lie substantially parallel to one another and having their corresponding opposite ends secured to respective spacer elements 11 and 12. These may be of the nature set forth in my said pending application Serial No. 233,884 to provide marginal elements which, in the embodiment under consideration, are shown as being merely corrugated strips of a metal, plastic, etc., Fig. 1b; or they may be provided as strips 14, Fig. 1c, of elastic material such as dental rubber to which the corrugated strips 14' are secured as well as the respective ends of the cord-like elements 15. It is preferred, however, to attach the cord-like elements first to strips of porous fibrous material such as the strips 13, 13', respectively, Fig. 1a, which may be of surgical gauze. The grid element of the structure may thus be readily machine-manufactured. The strips with attached cords are then secured, as by means of adhesive, to the bottom crest portions of respective spacer elements 11 and 12, as is indicated in Figs. 1 and 2. The cord-like elements 10 are to be tensed, and to this end have an elastic component imparted thereto. For example, they may be of elastic material such as elastic yarn; but this component may be provided by constructing the spacer elements in part of elastic material to which the cord-like elements are attached, said spacer elements then being the solid strips 14, Fig. 1c, of elastic material having the corresponding opposite ends of the cord-like elements 15 respectively secured thereto along the inner margin while the corrugated metal strips 14' extend along the outer marginal portion.

It will be appreciated that the cord-like elements and the corrugated strips will permit free flow of the electrolyte between electrodes 16 and 17. The material of all such elements and strips must be of a nature harmless to the electrolyte in order that the latter may not become contaminated and the efficiency of the capacitor impaired. The material should also be resistant to heat and the cord-like elements be of such a nature that they will not mechanically injure or scratch the surface of an anodized electrode or electrodes.

Upon successive supporting structures, as hereinbefore described, there are mounted the electrodes 16, 17 and, as is indicated in Figs. 1 and 2, upon respective interposed bands of fabric 18, 19 which may be of material similar to that of the strips 13, 13'. Surgical gauze, pure silica or pure glass wool have been found satisfactory in this respect; and may be in woven form or felted fabrics.

In some instances, it may be desirable to provide a grid of the cord-like members on both faces of an electrode. Reference being had to Fig. 3 of the drawings, both the top and bottom crests of the corrugated strips 20, 21 are then covered with fabric strips 22, 22', respectively; and the cord-like elements 23, 24 are secured at their corresponding opposite ends respectively to the fabric strips. The bottom cord-like element of one supporting structure then cooperates with the juxtaposed top cord-like element of the other supporting structure to confine electrodes 16', 17' between the two sets of grid structures formed by the respective cord-like elements—the intermediate fabric bands being omitted.

Figure 5:
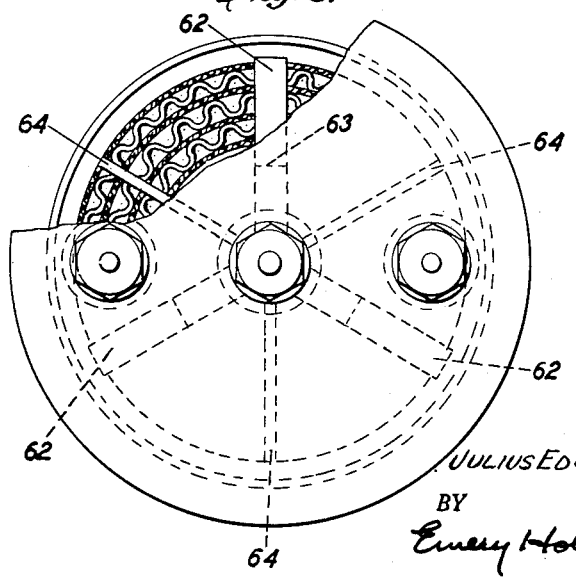
Fig. 5 is a plan view of the novel capacitor with condenser coiled upon its mandrel, a portion of the container top being broken away to disclose an arrangement for tensing the supporting-separator elements.

For coiling the various condenser elements upon the mandrel 25 (see Figures 4 and 5) a winding apparatus similar to that disclosed in my application Serial No. 233,884 may be utilized, modified to maintain the cord-like elements under suitable stretch during the assembling operation.

Before removing the mandrel, with the condenser elements coiled thereon, from the winding apparatus for use in a capacitor, there may be slipped over and at the opposite ends of the coil a number of spring U-shaped clamps. The outer finger 62 of a clamp is then secured at its inner end to the mandrel, as in fitting a groove therein; and the inner finger 63 is caused to extend between the cord-like members for contact laterally with the juxtaposed inner edges of the spacer element to assure thereby that the tension on the cord-like members will be maintained in the condenser assembly. To fix the position of a condenser unit convolutions axially on the mandrel 25, pins 64 are provided to extend radially outwardly from said mandrel at opposite ends of the assembly, the same being located, for example, to contact the ends of the convolutions and between the outer fingers of the clamps.

I claim:

1. A combined spacer and insulator unit for the electrodes of an electrolytic capacitor of the coil type, comprising a pair of longitudinal marginal spacer elements of sensible thickness; and a grid structure of transverse, substantially parallel and tensible separator elements made of insulating material of less thickness than said marginal spacer elements to afford a skeleton channel support within the outer faces of the marginal spacer elements, said channel support elements to this end being attached at their respective ends to the inner edges of the marginal spacer elements.

2. A combined spacer and separator unit according to claim 1, wherein the grid structure is secured to the spacer elements on one side of the median plane thereof.

3. A combined spacer and separator unit according to claim 2, wherein a further and like grid structure is secured to the spacer elements on the opposite side of the median plane thereof.

4. A combined spacer and separator unit according to claim 1, wherein the cord-like elements have an elastic component.

5. A combined spacer and separator unit according to claim 1, wherein the cord-like elements are of elastic yarn.

6. A combined spacer and separator unit according to claim 1, wherein the spacer elements comprise elastic material.

7. A combined spacer and separator unit according to claim 1, wherein each of the spacer elements comprises a narrow strip of fibrous material.

8. A combined spacer and separator unit according to claim 7, wherein a corrugated strip of metal is secured along one plane of the crests thereof to each of the strips of fibrous material.

9. A combined spacer and separator unit according to claim 8, wherein a further pair of the strips of fibrous material is provided, the individual strips being respectively secured to each of the corrugated metal strips along the other plane of the crests thereof.

10. A combined spacer and separator unit according to claim 9, wherein a grid structure is attached to one pair of the strips of fibrous material and a similar grid structure to the other pair of strips of fibrous material located respectively at the upper and lower crests of the corrugations of each of the metal strips thus providing positively a space therebetween for an electrode.

11. A coiled condenser unit for electrolytic capacitors, comprising at least a pair of longitudinal marginal and narrow spacer elements; a grid structure comprising tensed elastic cord-like separator and supporter elements of like length disposed transversely between the said spacer elements substantially parallel to one another and attached at their respective ends to the corresponding spacer elements; and a pair of electrode elements upon opposite sides of the cord-like supporter elements, at least one of said electrode elements being supported upon the cord-like elements between the spacer elements.

12. A coiled condenser unit for electrolytic capacitors according to claim 11, wherein the unit is wound upon a mandrel into a coil, and spreader means are fixed to the mandrel to extend outwardly therefrom and over the coil ends for engagement with the spacer elements to maintain the grid structure under tension.

References Cited in the file of this patent

UNITED STATES PATENTS

| | | |
|---|---|---|
| 110,476 | Knowlton | Dec. 27, 1870 |
| 1,190,886 | Giles | July 11, 1916 |
| 1,758,947 | Hammond | May 20, 1930 |
| 1,841,628 | Pickard | Jan. 19, 1932 |
| 2,119,628 | Robinson | June 7, 1938 |
| 2,199,446 | Ruben | May 7, 1940 |
| 2,209,820 | Koonz | July 30, 1940 |
| 2,358,654 | Nordberg | Sept. 19, 1944 |
| 2,585,671 | Morcaldi | Feb. 12, 1952 |

FOREIGN PATENTS

| | | |
|---|---|---|
| 726,621 | France | June 1, 1932 |